US006976369B2

(12) United States Patent
Nothum, Jr.

(10) Patent No.: US 6,976,369 B2
(45) Date of Patent: Dec. 20, 2005

(54) SPIRAL FREEZER, REFRIGERATION DELIVERY, ENCLOSURE AND DRIVE

(76) Inventor: Robert G. Nothum, Jr., 6356 W. State Hwy O, Willard, MO (US) 65804

( * ) Notice: Subject to any disclaimer, the term of this patent is extended or adjusted under 35 U.S.C. 154(b) by 0 days.

(21) Appl. No.: 10/339,175

(22) Filed: Jan. 9, 2003

(65) Prior Publication Data

US 2005/0092014 A1     May 5, 2005

Related U.S. Application Data

(60) Provisional application No. 60/348,007, filed on Jan. 10, 2002, provisional application No. 60/348,059, filed on Jan. 11, 2002.

(51) Int. Cl.[7] .......................... F25D 25/04; F25D 25/00
(52) U.S. Cl. .......................................... 62/380; 62/378
(58) Field of Search .............................. 62/62, 63, 114, 62/378, 380; 165/163, 86; 198/952

(56) References Cited

U.S. PATENT DOCUMENTS

| | | | | |
|---|---|---|---|---|
| 2,228,998 | A | 1/1941 | Birdseye ........................ | 62/99 |
| 2,229,000 | A | 1/1941 | Birdseye ...................... | 62/114 |
| 3,584,471 | A * | 6/1971 | Powell ......................... | 62/380 |
| 4,118,181 | A | 10/1978 | Onodera ..................... | 432/121 |
| 5,205,135 | A * | 4/1993 | Lang ............................ | 62/63 |
| 5,220,803 | A * | 6/1993 | Kiczek ......................... | 62/63 |
| 5,346,057 | A * | 9/1994 | Fisher et al. ................ | 198/778 |
| 5,460,260 | A * | 10/1995 | Ochs et al. .................. | 198/778 |
| 5,485,731 | A * | 1/1996 | Venetucci et al. ............ | 62/378 |
| 6,095,805 | A | 8/2000 | Kuenen ....................... | 432/144 |
| 6,305,274 | B1 | 10/2001 | Nothum, Sr. et al. ......... | 99/404 |

FOREIGN PATENT DOCUMENTS

| | | |
|---|---|---|
| EP | 0870430 A | 10/1998 |
| GB | 598744 | 2/1948 |
| JP | 5500877 | 1/1980 |
| JP | 2002068436 | 3/2002 |
| SU | 741023 | 6/1980 |
| WO | 9727130 | 7/1997 |

OTHER PUBLICATIONS

Product Brochure of Advanced Food Processing Equipment, Inc., entitled "Advanced I.Q.F. Spiral Freezer" (2 ledger-size sheets), undated.

(Continued)

Primary Examiner—Cheryl Tyler
Assistant Examiner—Filip Zec
(74) Attorney, Agent, or Firm—Jonathan A. Bay (57) ABSTRACT

A spiral freezer for continuous duty in continuous food process lines has a freezer compartment enclosing a double-helix arrangement, of which there is a helical run of a food-carrying conveyor in combination with a helical ramp or slideway for the food-carrying conveyor's helical run to ascend or descend on. The helical ramp is an assembly of numerous heat exchanger tubes, each wound helically and positioned in set lanes in the overall assembly of the ramp. An external refrigerant-circulating system is connected to circulate refrigerant through the heat exchanger tubes in order that hot components like compressors and condensers be kept outside of the freezer compartment for better energy efficiency. The foregoing conveyor and heat exchanger arrangement provides close proximity between the source(s) of heat in the food product on the conveyor and the sink of that heat to the refrigerant flowing inside the heat exchanger tubes.

19 Claims, 5 Drawing Sheets

OTHER PUBLICATIONS

Product Brochure of Frigoscandia Equipment, AB. entitled "Frigoscandia Classic Line" (5 sheets), undated.
EP Search Report, Appln. No. EP 04 00 0248 Date of Completion: Apr. 15, 2004 Date of Mailing: May 6, 2004.
EP Search Report Appln. No. EP 04 000 249 Date of Completion: Oct. 26, 2004: Date of Mailing: Nov. 5, 2004.
EP Search Report Appln. No. EP 04 000 249.5 Date of Completion: Oct. 26, 2004.

* cited by examiner

SPIRAL FREEZER, REFRIGERATION DELIVERY, ENCLOSURE AND DRIVE

CROSS-REFERENCE TO PROVISIONAL APPLICATION(S)

This application claims the benefit of U.S. Provisional Application No. 60/348,007, filed Jan. 10, 2002, and U.S. Provisional Application No. 60/348,059, filed Jan. 11, 2002.

This application is co-pending with commonly-owned, commonly-invented U.S. patent application Ser. No. 10/339,176, filed on even date herewith and entitled "SPIRAL OVEN, HEAT DELIVERY, ENCLOSURE AND DRIVE." All three of the foregoing patent disclosures are incorporated herein by reference.

BACKGROUND OF THE INVENTION

The invention generally relates to large scale food process lines of the type having a series of machines or stations arranged together and performing distinct processes on articles of food product for ultimately producing packaged and frozen food product. The frozen and packaged food product affords distribution to restaurant and/or consumer grocery stores and the like. For example and without limitation, in the case of frozen chicken strips for the fast food or consumer grocery stores, such a food process line might comprise the following stations in series:—1) pre-dust, 2) batter, 3) bread, 4) batter (again), 5) fry and freeze and package and so on.

Given the foregoing, the invention more particularly relates to a spiral freezer and refrigeration and enclosure therefor which accomplish much of the same work as by the known spiral freezers of large scale food process lines except scalable in a range between large scale and compact extremes.

A number of additional features and objects will be apparent in connection with the following discussion of preferred embodiments and examples.

SUMMARY OF THE INVENTION

It is an object of the invention to improve energy efficiency with the energy consumption needs of a continuous duty freezer as utilized in continuous food process lines.

It is another object of the invention to move as many heat-issuing components as possible—including compressors, pumps, motors, condensers, engines or turbines and the like—outside of the freezer compartment so that the cooling duty of the freezer is spared for food product only, and not waste on waste-heat sources.

It is an additional object of the invention to position refrigerant-carrying heat exchanger tubes close by the main food-carrying run of the freezer's conveyor in order to achieve close proximity between the source(s) of heat in the food product on the conveyor and the sink of that heat to the refrigerant flowing inside the heat exchanger tubes.

These and other objects and aspects of the invention are achieved in one version that has a freezer compartment enclosing a double-helix arrangement comprising one of a helical run of a food-carrying conveyor and another of helical heat exchanger tubes. The heat exchanger tubes include refrigerant input points and refrigerant discharge or output points adapted for service connections to a refrigerant circulating system. That way, the refrigerant circulating system can be located outside of the freezer compartment. Heat-issuing components of the refrigerant circulating system—such as and without limitation compressors, pumps, motors, or condensers—are therefore collectively disposed outside of the freezer compartment for improvement in energy efficiency. The double-helix arrangement of conveyor and heat exchanger tubes provides close proximity between the sources of heat in the food product on the conveyor and the sink of that heat to the refrigerant flowing inside the heat exchanger tubes. Preferably the heat exchanger tubes form a helical slideway for the helical run of the conveyor to slide thereon. Optionally the freezer compartment comprises a cylindrical tower sized for closely surrounding the double-helix arrangement.

The helical run of the conveyor is one aspect of an endless conveyor system of the freezer, and is flanked between an inflow section and an outflow section. The freezer compartment includes an inflow port and outflow port that are sized and arranged for through passage of the conveyor's inflow and outflow sections respectively. The conveyor further comprises a return run that links the outflow section with the inflow section and extends along a course disposed preferably totally, but at least predominantly outside the freezer compartment.

Another version of the inventive freezer for continuous duty in continuous food process lines optionally can be reckoned as follows. That is, this one has a conveyor comprising in sequence a food-carrying inflow section and main run and outflow section as well as an empty return run. The main run either ascends or descends in coils from the inflow section to the outflow section for economy of floor space. There is also an inventive arrangement of heat exchanger tubes entwined with the main run. The freezer includes a freezer compartment for enclosing the coiled main run of the food-carrying conveyor and entwined heat exchanger tubes. Such an entwined arrangement of conveyor and heat exchanger tubes provides close proximity between the source(s) of heat in the food product on the conveyor and the sink of that heat to the refrigerant flowing inside the heat exchanger tubes.

Generally speaking the heat exchanger tubes are entwined by virtue of being interlaced between the coils of the conveyor's main run. However, preferably the coils wrap a cylindrical surface and the character of the ascension or descension thereof is constant over the extent of the main run such that the main run defines a helical ribbon. That way, the heat exchanger tubes more particularly are arranged in a corresponding helical ribbon arrangement intertwined with the main run's helical ribbon arrangement. Individual ones of the heat exchanger tubes occupy set lanes in the overall helical ribbon arrangement thereof.

Aspects of the invention further pertain to a conveyor drive system. It is adapted for thermally isolating its heat-issuing components—such as and without limitation its motors, engines or turbines—from dumping heat into the freezer compartment. This is achieved by placement of such hot components outside of the freezer compartment, and again as is the case with the hot components of the refrigerant circulating system, energy efficiency is promoted.

An additional way of looking at the invention has it being described as comprising a conveyor which in sequence includes a food-carrying inflow section and coiled run and outflow section linked back up to the food-carrying inflow section by an empty return run. The coiled section either ascends or descends between the inflow and outflow sections. The heat exchanger tubes are arranged for close-proximity extraction of heat from food product carried on coiled run of the conveyor, and the freezer compartment is sized for closely enclosing at least the coiled run of the conveyor. The heat exchanger tubes are arranged in close-proximity in part with the coiled run of the conveyor by virtue of being arranged to undergird the coiled run.

The freezer further comprises a conveyor drive system. To understand aspects thereof, it may help to consider that the coiled run is arranged as wrapped around the surface of an imaginary cylinder. Accordingly the coiled run defines a hollow cylindrical core in its middle. That way, the conveyor drive system comprises a driven barrel disposed inside the hollow cylindrical core of the coiled run. The barrel impermanently interfaces the coiled run at least along spaced intervals to motivate the conveyor in a direction of advance through the coiled run. The driven barrel is supplied a drive input from outside the freezer compartment by a drive shaft that is passed into the freezer compartment. That way, hot components can be isolated outside the freezer compartment for energy efficiency purposes. The freezer compartment generally forms a tower that closely surrounds the coiled run, and has a floor and ceiling. The barrel is propped or suspended off the floor of the freezer and gapped from the ceiling in order that there is clearance both above and below the barrel for circulation of air currents inside the freezer compartment. For this purpose, freezer preferably further includes a circulating fan for setting up air circulation inside the freezer compartment, blowing or suctioning an air current through the core of the barrel in one direction and inducing a return current in the opposite direction on the outside of the barrel, like a donut skin turning inside out.

And briefly, among many other desirable aspects of the invention not mentioned above, there is this significant other one. That is, the freezer compartment can be "zoned." More particularly, the heat exchanger tubes can be differentiated into zones according to elevation. One way to do this has the refrigerant circulating system differentially servicing the differentiated zones of heat exchanger tubes in order to establish elevational zones within the freezer compartment. Preferably the different zones are different not only by elevation but also by performance characteristics such as differentiated according what heat load can be pulled. More simply, an introductory section of the food-carrying main run can be maintained at a given cold temperature while a successive section might be zoned for maintenance at a colder temperature still.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figures 1, 4:
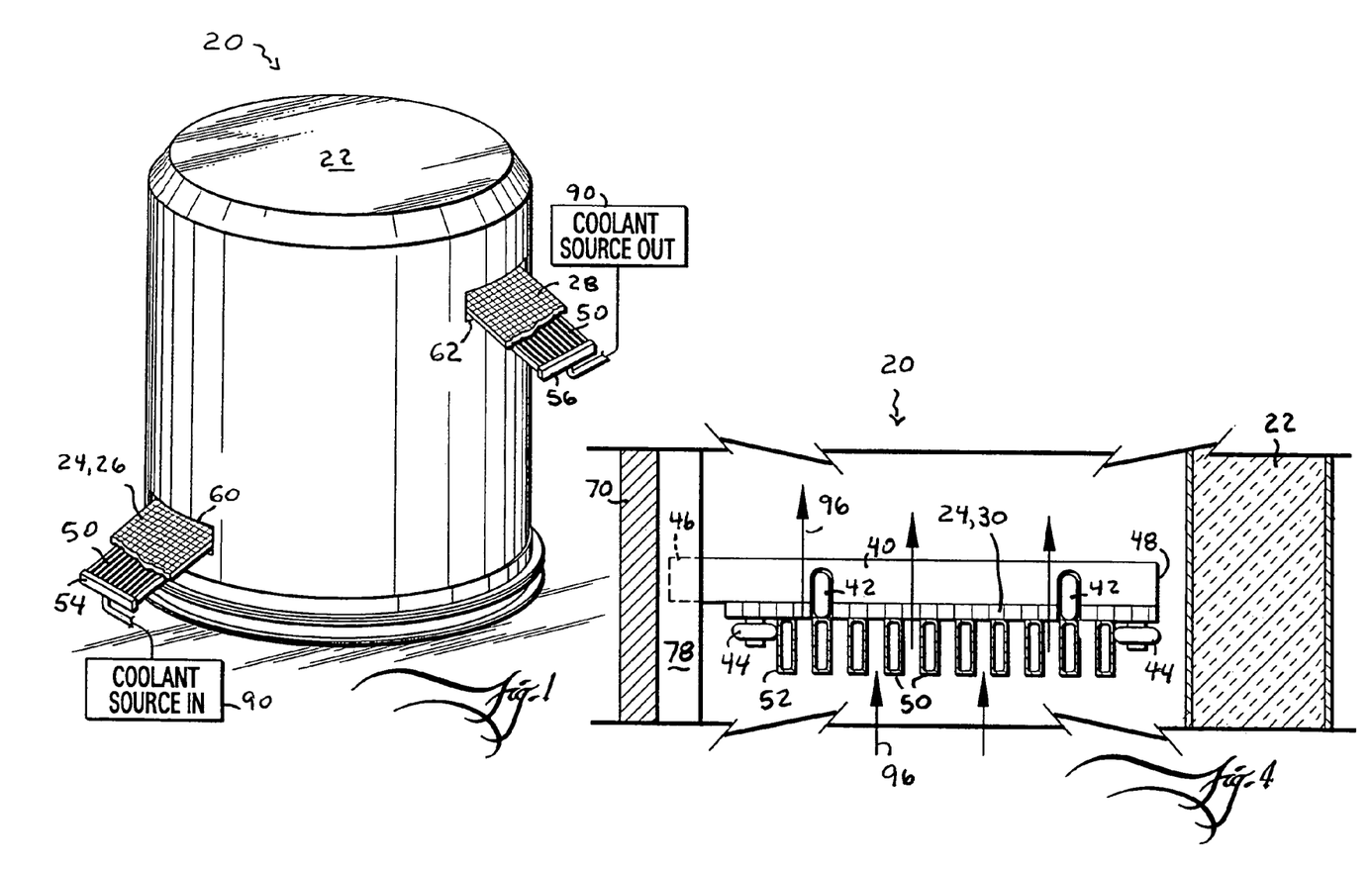
FIG. 1 is a perspective view of a spiral freezer housed inside an enclosure therefor and in accordance with the invention, wherein the view shows a ¼-tier style of infeed/discharge configuration as an example only for convenience of illustrative purposes.
FIG. 4 is a section view taken along line IV—IV in FIG. 3.

FIG. 1 is a perspective view of a spiral freezer 20 in accordance with the invention, the freezer compartment thereof being enclosed within a cylindrical-tower enclosure 22 therefor. Food product is conveyed through the freezer 20 by means of an endless conveyor belt 24 for which FIG. 1 shows a ¼-*tier* style of conveyor infeed 26 to discharge 28 configuration as an example only for convenience of illustrative *purposes*. That is, the conveyor 24's discharge 28 shoots out on a tangent that projects about 90° counter-clockwise (ie., relative the vertical axis of the spiral's center) from the tangent of the infeed 26. In the industry, other configurations are known including without limitation ½-*tier* (180°), ¾-tier (270°) and full tier (360°) and so on. The invention is not limited to any particular infeed 26 to discharge 28 configuration.

The spiral freezer 20 comprises a continuous conveyor 24, spaced portions of which are shown by FIG. 1. That is, a small section of conveyor 24 is in view at an infeed station 26, another like small section of conveyor 24 is in view at the discharge station 28. As better shown by FIG. 2, the conveyor 24 provides a continuous food-carrying run 30 between the infeed and discharge stations 26 and 28. The continuous run 30 of the conveyor 24 spirals up from the low infeed station 26 to the high discharge station 28. Although this is not shown by the drawings, food product can be originally introduced onto the infeed section 26 by a conventional transfer arrangement from an upline conveyor or the like, as is known in the art. Similarly, food product can be discharged onto downline conveyors by conventional transfer arrangements or the like as is also known in the art.

While this too is not shown by the drawings, the discharge and infeed sections 28 and 26 of the continuous conveyor are linked together by a return run of the conveyor. Persons having ordinary skill in the art can readily construct such an arrangement of a return run, which return run is preferably situated entirely or predominantly outside of the cylindrical enclosure 22, an example of a suitable arrangement of a return run being shown by the above-referenced companion U.S. patent application Ser. No. 10/339,176, filed on even date herewith.

The food-carrying conveyor 24 preferably takes the form of, for example and without limitation, a woven wire mesh belt as shown by U.S. Pat. No. 6,305,274—Nothum (or as more particularly shown by FIG. 6 thereof). Woven wire mesh belts such as that are advantageously formed into endless conveyors such as here. These woven wire belts are desirable for many reasons. Among them, these belts provide greater than 85% open area. This allows fairly unrestricted frigid air circulation to get at the food product. This also facilitates wash down and inspection. They are lightweight and don't demand much drive power. Also, they turn tight circumferences around small transfer rollers to ensure gentle handling and smooth transfer of various products. These belts can be produced in about any width, with commercially available sources providing standardized widths available off-the-shelf as anywhere between about four inches (0.1 m) and twelve feet (3.7 m). Needless to say, these belts can be produced in indefinitely long lengths.

Figure 2:
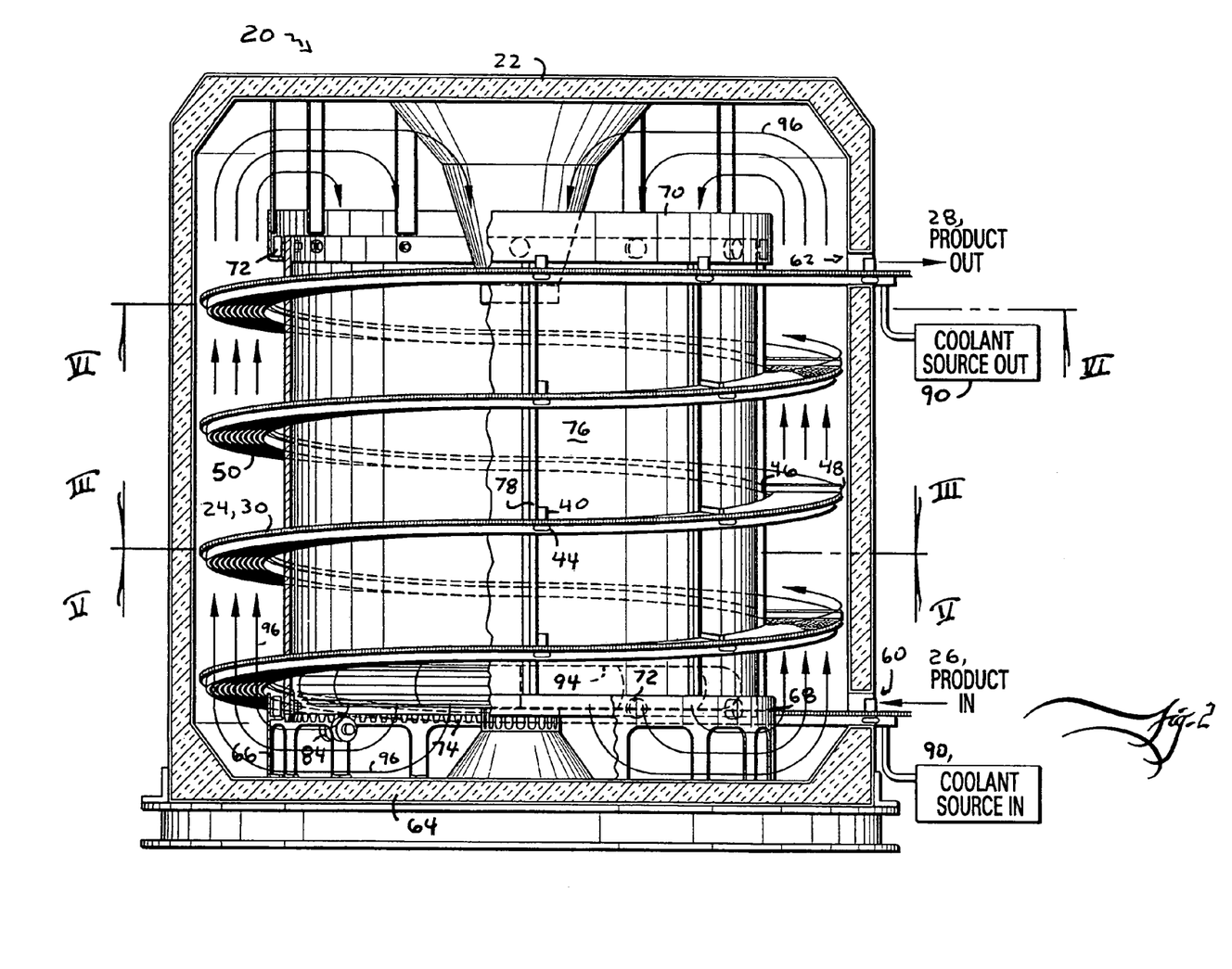
FIG. 2 is an enlarged, partial section view of the spiral freezer and enclosure of FIG. 1, as taken through a vertical plane containing the central axis.

FIG. 2 of the drawings shows that the conveyor 24 in accordance with the invention further comprises a series of longitudinally spaced flights 40 fixed to the conveyor 24, preferably with a uniform spacing therebetween. FIG. 4 shows one such flight 40 in better detail. To turn to FIG. 4, it shows a transverse-section cut of the conveyor 24 as provided with a transverse flight 40 sitting on the conveyor 24's main food-carrying run 30. The flight 40 has mounted to it four rollers 42/44. Two such rollers 42 are mounted for riding along the top of the conveyor-carrying surface 50, which will be more particularly described below. Two other rollers 44 are mounted for tracking against the opposite lateral sides of the conveyor-carrying assembly 50 as shown. The rollers 42/44 cooperate to reduce the sliding resistance to the conveyor 24 that for the most part scrapes along the given conveyor-carrying surface 50 as well as maintain tracking therefor. The flight 40 extends between relatively inboard and outboard ends 46 and 48. The outboard end 48 terminates with the mounting of the outboard tracking-roller 44. The inboard end 46 is constructed as an overhang section that overhangs the inboard tracking-roller 44. The operative advantages of the inboard overhang 46 are more particularly described below in connection with driving the conveyor 24 up its spiral ramp 50.

Returning to FIG. 2, the conveyor 24's main food-carrying run 30 scrapes on top of a spiral ramp 50. The spiral ramp 50 is continuous between the infeed station 26 through to the discharge station 28. FIGS. 2 and 4 taken together show that this spiral ramp 50 is produced from a series of tube coils 52 helically wound as shown. The ramp 50 can be reckoned as a helical ribbon. The individual tubes 52 occupy set lanes within the helical ribbon defined by the tube assembly 50 as a whole. Preferably the tubes 52 are rectangular tubes as shown in FIG. 4 in transverse section. Preferably, the rectangular tubes 52 are arranged side by side such that the broad side of one is spaced by a gap from the broad side of another. The tubes 52 are hence stood on their narrow sides. The gaps increase the heat sink surface area and thereby enhance the efficiency of refrigerating the air, and ultimately pulling warmth out of the warm or room-temperature food product. The top narrow sides are arranged on a uniform level to present a smooth spiral ramp (eg., 50) or scrape surface for the main spiraling food-carrying run 30 of the conveyor 24.

Figure 3:
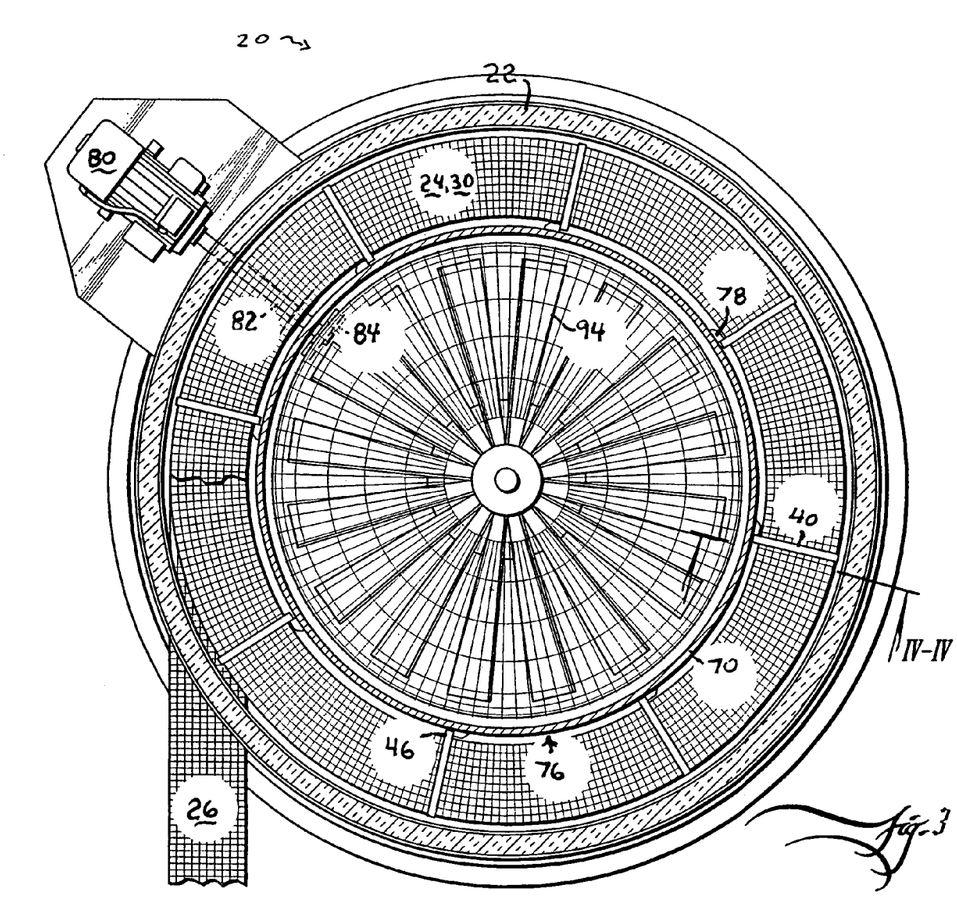
FIG. 3 is a section view taken in the direction of arrows III—III in FIG. 2.
Figure 5:
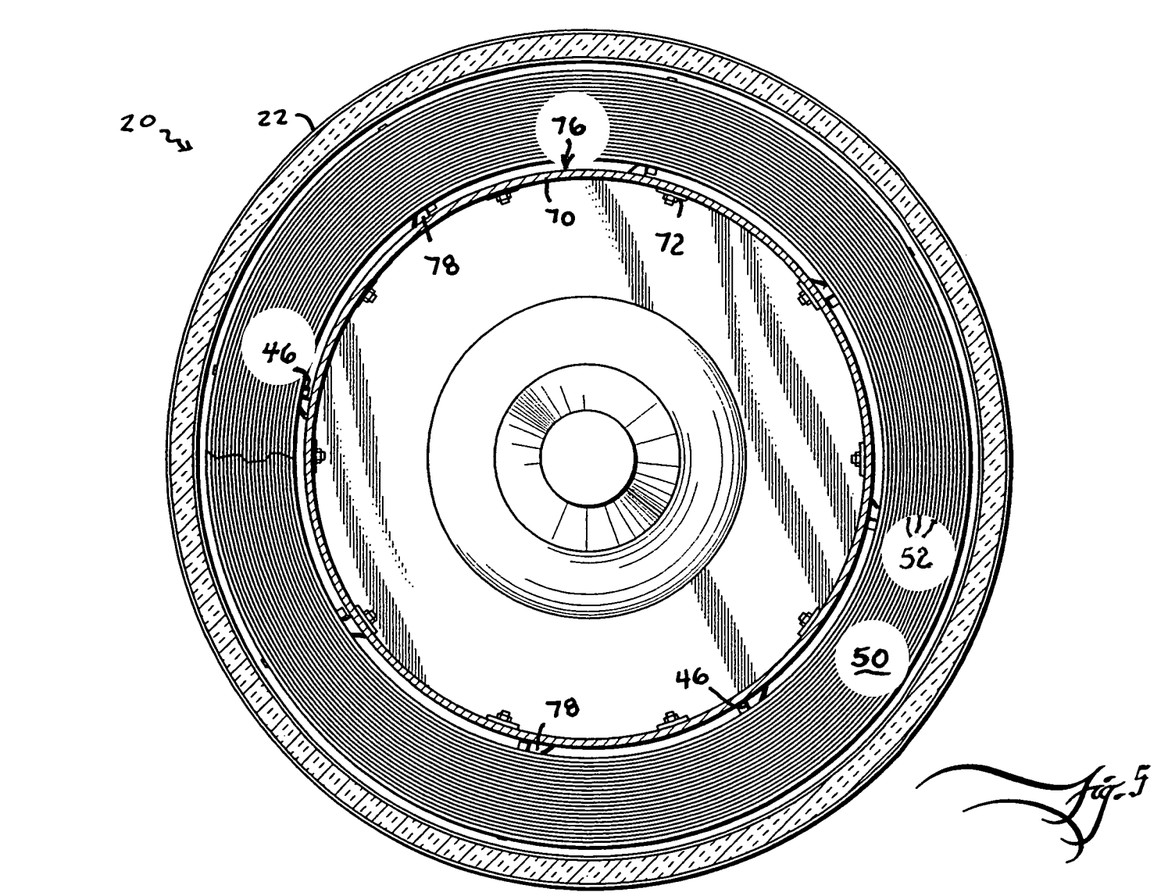
FIG. 5 is a section view taken in the direction of arrows V—V in FIG. 2, the cutting plane therefor being in common with that for FIG. 3 except the vantage point being from above rather than from below; and, FIG. 6 is a section view taken in the direction of arrows VI—VI in FIG. 2.

FIGS. 1 and 2 show that the enclosure 22 comprises a closed cylinder having insulated walls. The enclosure 22 is provided with infeed and discharge openings 60 and 62 for the introduction and discharge of the conveyor 24 respectively. The enclosure 22 has a floor 64 on which stands a squat stand 66. The squat stand 66 has a set of short legs arranged in a circle to prop up a circular track 68. FIG. 2 (among others) shows that the hollow interior of the spiral ramp 50 is occupied by a large turning barrel 70 stood on an end. The barrel 70 has a bottom end carrying a series of rollers 72 to ride in the circular track 68 of the squat stand 66. FIG. 5 shows that the barrel 70 has a top end carrying a like series of rollers 72 to ride in a hoop track 68 that is suspended from the enclosure 22's ceiling. Returning to FIG. 2, the squat stand 66 props up the barrel 70 some spacing off the floor 64 of the enclosure. The rollers 72 riding in the circular track 68 allow the barrel 70 to revolve about the vertical central axis. The bottom rim of the barrel 70 is formed with gear teeth such that the barrel 70's bottom rim takes the form of a ring gear 74, which can be alternatively described as a face gear 74. FIG. 3 shows that at least one or more electric motors 80 are mounted outside the enclosure for supplying drive power to the barrel 70. The electric motor 80 turns a drive shaft 82 which extends in through a journal or bearing in the enclosure 22's sidewall and which is supported or braced from or to the squat stand 66 by a gudgeon or the like, to terminate in a pinion 84 aligned to mesh with the barrel 70's face gear 74. Hence turning the drive shaft 82 turns the pinion 84 which in turn causes the barrel 70 to revolve on top of the squat stand 66's ring track 68.

Figure 6:
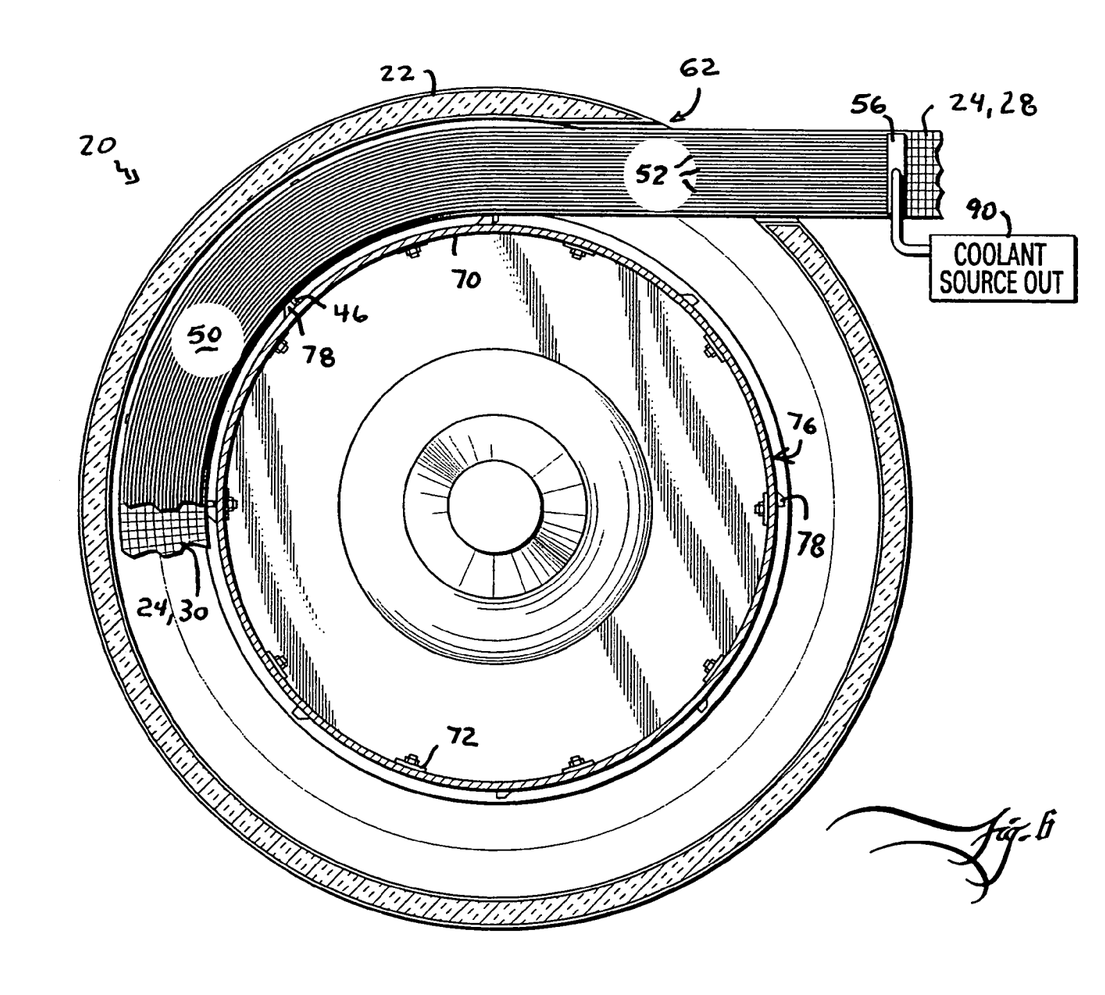

Any of FIG. 2, 3 or 6 among others, show that the barrel 70 has an outer wall or skin 76 that is striped with a series of paddles 78. The exterior paddles 78 project out sufficiently to catch and drive against the inboard overhangs 46 of the conveyor 24's flights 40. Hence the conveyor 24 is motivated up the spiral ramp 50 in this fashion. The turning barrel 70 has the paddles 78 revolving in unison with the barrel 70's skin 76. The infeed section 26 of the conveyor 24 is fed to the barrel 70 along a tangent of the barrel's skin 76. The tangential course of the infeed section 26 is aligned such that the inboard overhang 46 approaches so as to just nearly touch the barrel 70's skin 76. While this is happening, then along comes one of the vertical paddles 78 on the barrel 70's skin 76 and smacks up against the inboard end 46 of the conveyor 24's flight 40. The vertical paddle 78 drives the flight 40 such that the entire conveyor 24 is motivated to advance or traverse forwardly on the spiral ramp 50 in consequence. Indeed, this action between barrel paddles 78 and conveyor flights 40 occurs in endless succession so that at any one instance, there are numerous flights 40 being driven by the several paddles 78. For example, FIG. 3 shows that the barrel 70 has about eight (8) paddles 78 angularly spaced evenly from each other. The conveyor 24's flights 40 are spaced correspondingly such that for each 360° around one helical coil there are eight (8) flights 40 in driven contact with the eight (8) paddles 78. If it is reckoned in FIG. 2 that there are about 4-1/4 helical coils, then there are about thirty-four (34) concurrent instances of paddle-to-flight contact (ie., 78-to-40 contact). In this way the turning barrel 70 supplies drive power to the conveyor 24.

FIG. 4 shows one example instance of paddle-to-flight contact (ie., 78-to-40 contact). The revolving paddle 78—revolving because the barrel skin 76 to which it is attached is revolving—pushes against the flight 40 to motivate the flight 40 and the woven wire mesh belt sections between spaced flights 40 to move in the direction of advance up the helical ramp 50. As this flight 40 winds its way around the helical coils of the ramp 50, it slides vertically up the paddle 78 at the same time. When this given flight 40 first contacts the paddle 78 at the infeed station 26, it hits the paddle 78 near the lower end thereof. In contrast, when this given flight 40 separates from the paddle 78 on a tangential exit line at the discharge station 28, the flight 40 does so from the upper end of that paddle 78. Hence all the time the flight 40 is pushed by the paddle 78 it is slowly sliding upwardly too. FIG. 4 also shows the cooperation of the inboard and outboard tracking-rollers 44 in preventing the flight 40 from deflecting off the paddle 78.

To return to the matter of the series of tubes 52 that comprise the ramp 50, the tubes 52 are hollow and inside thereof flows the refrigerant. FIGS. 1 and 2 show a supply header 54 at the infeed station 26 providing a pumped input of refrigerant from the refrigerant source 90, as well as showing an exhaust header 56 at the discharge station 28 for returning the refrigerant to the refrigerant source 90 for re-processing and recycling through the coils of tubes 52. Thermal-fluid or -medium supply and exhaust headers 54 and 56 are more particularly shown and described in the above-referenced U.S. Pat. No. 6,305,274—Nothum, which is incorporated herein by this reference to it. The conveyor 24's woven wire mesh preferably scrapes immediately on top of the tubes 52 to close up the spacing between the food product and the heat sink capacitance of tubes 52 as much as shown in FIG. 4 for example. FIG. 3 shows a fan 94 disposed in the top end of the barrel 70 for circulating the interior air within the enclosure 22. FIG. 4 shows that the air is circulated such that it blows up through the gaps between the individual tubes 52 (and indicated by air circulation reference arrows 96). FIG. 2 shows that the overall air circulation pattern is like a donut skin rotating inside and out as shown without actually orbiting the vertical central axis. It is an advantage to prop up the barrel 70 by the squat stand 66 to allow an underflow of circulating air. FIG. 2 also shows that the barrel 70's upper edge is gapped way from the enclosure 22's ceiling to likewise allow an overflow as desired.

Given the foregoing, the advantages of the invention include the following. The enclosure 22 that houses the spiral freezer 20's spiral ramp 50 is shrunk down to the size of approximately the same as the outside of the spiral freezer ramp 50. The barrel 70 provides an advantageous way of driving the conveyor 24, as from impermanent interfacing with the conveyor 24 from spaced inboard projections 46. The barrel 70's skin 76 also blocks the inboard side of the freezer ramp 50 so that air circulation can be forced in the donut skin shape shown by FIG. 2. Along with this, the barrel 70 is propped up off the enclosure 22's floor to allow an underflow as well as gapped from the enclosure 22's ceiling to allow an overflow. The ramp surface 50 is produced as a series of coiled tubes 52 in which flow the refrigerant. That way the transfer of heat from the food product into the refrigerant occurs in as close as proximity as shown by the drawings. Also, the electric drive motor 80 for the barrel 70 is positioned outside the enclosure 22's confines. Likewise the electric motor drive for the air circulation fan 94 is thermally isolated from the freezer compartment defined by the enclosure. Placing the electric drive motors 80 and the like outside of the freezer compartment (eg., 22) avoids waste heat being dumped inside the freeze compartment (eg. 22), which is more energy efficient and therefore saves energy costs.

Optionally the refrigerant source 90 comprises a conventional refrigerant circulating system comprising either a convention vapor compression-cycle machine having a closed loop refrigerant cycled through a compressor, a condenser, an expansion process, and then an evaporator before returning to the compressor (not shown). The refrigerant source 90 might be configured in other forms including absorption-cycle machines or heat pipes and the like. Regardless, the inventive aspect of the heat exchanger ramp 50 and freezer compartment (eg., 22) in connection with the present invention include that the heat-producing components of the refrigerant source 90 can be located outside the freezer compartment (eg., 22). That way, any of the refrigerant source 90's heat issuing components such as compressors, pumps, motors, or condensers and the like are collectively disposed outside of the freezer compartment (eg., 22) in order to maximize energy efficiency. At least that is, by avoiding waste by locating hot components inside the freezer compartment (eg., 22).

Further advantages of the invention include that this configuration is amenable to zoning. That is, intermediate exhaust and supply headers (eg., like 56 and 54) can be connected at an intermediate elevation with the helical assembly 50 of tubes 52 (this is not shown). Hence the set of tubes 52 in the zone defined below the intermediate elevation might be supplied refrigerant at one given temperature while the set of tubes 52 in the zone defined above the intermediate elevation might be supplied colder refrigerant or vice versa. That way, a user can establish not only a cold lower zone but then also an even colder upper zone. The barrel 70 might be comparably altered for zoning as by providing it with a gap in its waist. A horizontal circular plate at the waist as well as incorporation of an additional air fan (eg., like 94) in the lower zone can set up separate upper and lower donut patterns of air circulation. Preferably the barrel paddles 78 would reach across the barrel skin 76's waist gap and tie together the upper and lower bands or hoops thereof (again, not illustrated).

In the description, the term "spiral" and "helical" have been used generally interchangeably unless context dictates otherwise.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A freezer for continuous duty in continuous food process lines, comprising:
   a freezer compartment enclosing a double-helix arrangement comprising one of a ventilated helical run of a food-carrying conveyor and another of helical heat exchanger tubes arranged with ventilation gaps therebetween to allow vertical circulation of air therethrough;
   wherein said helical run of the food-carrying conveyor defines a helical ribbon and said helical heat exchanger tubes are arranged in a corresponding helical ribbon arrangement that is entwined with the food-carrying conveyor's helical run's helical ribbon arrangement; and
   wherein said heat exchanger tubes include refrigerant input points and refrigerant discharge or output points adapted for service connections to a refrigerant circulating system, whereby said double-helix arrangement of conveyor and heat exchanger tubes provides close proximity between the sources of heat in the food product on the conveyor and the sink of that heat to the refrigerant flowing inside the heat exchanger tubes.

2. The freezer of claim 1 wherein said heat exchanger tubes form a helical slideway for the helical run of the conveyor to slide thereon.

3. The freezer of claim 1 wherein individual ones of the heat exchanger tubes occupy set lanes in the helical ribbon arrangement thereof.

4. A freezer for continuous duty in continuous food process lines, comprising:
   a ventilated conveyor comprising in sequence a food-carrying inflow section, main run, and outflow section as well as an empty return run, which main run either ascends or descends in coils from the inflow section to the outflow section for economy of floor space;
   an arrangement of heat exchanger tubes entwined with the main run being arranged with ventilation gaps therebetween to allow in combination with the ventilated conveyor the vertical circulation of air therethrough;

a freezer compartment for enclosing the coiled main run of the food-carrying conveyor and entwined heat exchanger tubes wherein said heat exchanger tubes include refrigerant input points and refrigerant discharge or output points adapted for service connections to a refrigerant circulating system, whereby said entwined arrangement of conveyor and heat exchanger tubes provides close proximity between the source(s) of heat in the food product on the conveyor and the sink of that heat to the refrigerant flowing inside the heat exchanger tubes;

wherein said heat exchanger tubes are entwined by virtue of being interlaced between the coils of the conveyor's main run.

5. The freezer of claim 4 wherein said coils wrap a cylindrical surface and said ascension or descension is constant over the extent of the main run such that the main run defines a helical ribbon.

6. The freezer of claim 4 wherein said coils are circular and said ascension or descension is constant over the extent of the main run such that the main run defines a helical ribbon; and, the heat exchanger tubes are arranged in a corresponding helical ribbon arrangement intertwined with the main run's helical ribbon arrangement, wherein individual ones of the heat exchanger tubes occupy set lanes in the helical ribbon arrangement thereof.

7. The freezer of claim 4 wherein said heat exchanger tubes form a coiled ascending or descending slideway for said main run of the food-carrying conveyor to slide thereon.

8. A freezer for continuous duty in continuous food process lines, comprising:

a ventilated conveyor comprising in sequence a food-carrying inflow section, coiled run, and outflow section as well as an empty return run, wherein the coiled section either ascends or descends between the inflow and outflow sections;

heat exchanger tubes arranged for close-proximity extraction of heat from food product carried on coiled run of the conveyor and being arranged with ventilation gaps therebetween to allow in combination with the ventilated conveyor the vertical circulation of air therethrough;

a freezer compartment for enclosing at least the coiled run of the conveyor; and a refrigerant circulating system for circulating refrigerant through the heat exchanger tubes;

wherein said coiled run wraps around the surface of an imaginary cylinder and accordingly defines a hollow cylindrical core therefor;

said freezer further comprising a conveyor drive system having a driven barrel disposed inside the hollow cylindrical core of the coiled run, the barrel impermanently interfacing the coiled run at least at intervals to motivate the conveyor in a direction of advance through the coiled run.

9. The freezer of claim 8 wherein said conveyor drive system is adapted for thermally isolating heat issuing components that comprise any of motors, engines or turbines from dumping heat into the freezer compartment by virtue of placement outside of the freezer compartment, whereby energy efficiency is promoted.

10. The freezer of claim 8 wherein the driven barrel is supplied a drive input from outside the freezer compartment by a drive shaft that is passed into the freezer compartment.

11. The freezer of claim 8 wherein said freezer compartment forms a tower closely surrounding the coiled run and having a floor and ceiling; and wherein said barrel is propped or suspended off the floor of the freezer and gapped from the ceiling in order that there is clearance both above and below the barrel for circulation of air currents inside the freezer compartment;

said freezer further comprising a circulating fan for setting up air circulation inside the freezer compartment, blowing or suctioning an air current through the hollow core of the barrel in one direction and inducing a return current in the opposite direction on the outside of the barrel, like a donut skin turning inside out.

12. A freezer for continuous duty in continuous food process lines, comprising:

a ventilated conveyor comprising in sequence a food-carrying inflow section, coiled run, and outflow section as well as an empty return run, wherein the coiled section either ascends or descends between the inflow and outflow sections;

heat exchanger tubes arranged for close-proximity extraction of heat from food product carried on coiled run of the conveyor and being arranged with ventilation gaps therebetween to allow in combination with the ventilated conveyor the vertical circulation of air therethrough;

a freezer compartment for enclosing at least the coiled run of the conveyor; and a refrigerant circulating system for circulating refrigerant through the heat exchanger tubes;

wherein the heat exchanger tubes can be differentiated into zones according to elevation, said refrigerant circulating system differentially servicing the differentiated zones of heat exchanger tubes in order to establish elevational zones within the freezer compartment that can be differentiated according what heat load can be pulled.

13. A freezer for continuous duty in continuous food process lines, comprising:

a freezer compartment enclosing a double-helix arrangement that is arranged about a generally vertical central axis and defines a hollow cylindrical core as well as an outer cylindrical perimeter, said double-helix arrangement comprising one of a ventilated helical run of a food-carrying conveyor and another of a ventilated helical ramp;

an open-ended inner cylindrical partition substantially occupying the hollow cylindrical core and extending vertically substantially coextensively with the double-helix arrangement as well as being either suspended or propped in the compartment and providing gaps proximate the floor and ceiling respectively to allow both an underflow along the floor and an overflow along the ceiling respectively; and a source of air circulation to induce a substantially vertical current inside the cylindrical partition;

said freezer compartment having a lateral cylindrical sidewall, a ceiling, a floor, an upper infill section spanning between the ceiling and sidewall as well as a lower infill section spanning between the floor and sidewall in order to—in part, and cooperatively—eliminate perpendicular intersections for ease of cleaning away contaminants, one central protuberance bulging up from the floor, and another central protuberance dropping down from the ceiling, which altogether generally define a donut-shaped interior contour for shaping the air circulation pattern to simulate a donut skin rotating inside out without actually orbiting the vertical central axis, whereby any given particle in said circulation pattern generally completes a circuit without crossing over the central axis and within generally the same radial slice, substantially independent of any orbiting of the central vertical axis.

14. A freezer for continuous duty in continuous food process lines, comprising:
   a freezer compartment enclosing a double-helix arrangement that is arranged about a generally vertical central axis and defines a hollow cylindrical core, said double-helix arrangement comprising one of a helical run of a food-carrying conveyor and another of a helical ramp;
   a drive cylinder substantially occupying the hollow cylindrical core and extending vertically substantially coextensively with the double-helix arrangement double-helix arrangement as well as being either suspended or propped in the compartment for rotation;
   said drive cylinder having drive applicators and said conveyor having drive-applicator responders whereby the rotation of the drive cylinder motivates the conveyor to transit the helical ramp; and
   a drive source applied to the drive cylinder spaced radially substantially away from the central vertical axis whereby the drive cylinder is liberated from the necessity of clutter within the hollow core thereof of structure as central shafting or radial spokes.

15. The freezer of claim 14 further comprising:
   a source of air circulation operative inside the drive cylinder to induce a substantially vertical current within said drive cylinder;
   wherein said drive cylinder is furthermore either suspended or propped in the compartment to provide gaps proximate the floor and ceiling respectively to allow both an underflow along the floor and an overflow along the ceiling respectively, whereby said drive cylinder concurrently functions as a transmission of drive to the conveyor at the same time as functioning as a duct for the circulation of air.

16. A freezer for continuous duty in continuous food process lines, comprising:
   a freezer compartment enclosing a ventilated helical run of a food-carrying conveyor that is arranged about a generally vertical central axis and defines a hollow cylindrical core as well as an outer cylindrical perimeter;
   an open-ended inner cylindrical partition substantially occupying the hollow cylindrical core and extending vertically substantially coextensively with the ventilated helical run of the food-carrying conveyor as well as being either suspended or propped in the compartment and providing gaps proximate the floor and ceiling respectively to allow both an underflow along the floor and an overflow along the ceiling respectively; and
   a source of air circulation to induce a substantially vertical current inside the cylindrical partition;
   said freezer compartment having a lateral cylindrical sidewall, a ceiling, a floor, an upper infill section spanning between the ceiling and sidewall as well as a lower infill section spanning between the floor and sidewall in order to—in part, and cooperatively—eliminate perpendicular intersections for ease of cleaning away contaminants, one central protuberance bulging up from the floor, and another central protuberance dropping down from the ceiling, which altogether generally define a donut-shaped interior contour for shaping the air circulation pattern to simulate a donut skin rotating inside out without actually orbiting the vertical central axis, whereby any given particle in said circulation pattern generally completes a circuit without crossing over the central axis and within generally the same radial slice, substantially independent of any orbiting of the central vertical axis.

17. A freezer for continuous duty in continuous food process lines, comprising:
   a freezer compartment enclosing a ventilated helical run of a food-carrying conveyor that is arranged about a generally vertical central axis and defines a hollow cylindrical core as well as an outer cylindrical perimeter;
   a drive cylinder having a lateral cylindrical sidewall extending between upper and lower hoop edges, wherein said drive cylinder substantially occupies the hollow cylindrical core and extends vertically substantially coextensively with the ventilated helical run of the food-carrying conveyor as well as being either suspended or propped in the compartment for rotation by either a ring arrangement of hangers associated with the upper hoop edge or a ring arrangement of rolling stock associated with the lower hoop edge, either of which allows the elimination of a central axle and spokes therefor;
   said drive cylinder having drive applicators and said conveyor having drive-applicator responders whereby the rotation of the drive cylinder motivates the conveyor to transit the helical ramp; and
   a drive source applied to the drive cylinder along the sidewall thereof or along either of the hoop edges but not by a central axle having spokes radiating to fixtures on the sidewall.

18. The freezer of claim 17 further comprising:
   a source of air circulation operative inside the drive cylinder to induce a substantially vertical current within said drive cylinder;
   wherein said drive cylinder is furthermore either suspended or propped in the compartment to provide gaps proximate the floor and ceiling respectively to allow both an underflow along the floor and an overflow along the ceiling respectively, whereby said drive cylinder concurrently functions as a transmission of drive to the conveyor at the same time as functioning as a duct for the circulation of air.

19. A freezer for continuous duty in continuous food process lines, comprising:
   a freezer compartment enclosing a ventilated helical run of a food-carrying conveyor that is arranged about a generally vertical central axis and defines a hollow cylindrical core as well as an outer cylindrical perimeter;
   an open-ended inner cylindrical partition substantially occupying the hollow cylindrical core and extending vertically substantially coextensively with the ventilated helical run of the food-carrying conveyor as well as being either suspended or propped in the compartment and providing gaps proximate the floor and ceiling respectively to allow both an underflow along the floor and an overflow along the ceiling respectively; and
   at least one air circulation fan operatively disposed inside the open-ended inner cylindrical partition to induce a substantially vertical current therein, whereby said fan as disposed in the open-ended inner cylindrical partition allows reduction of the number of prospective air circulation fans needed for operative sufficiency to just said one.

* * * * *